United States Patent
Huebler et al.

(10) Patent No.: US 6,725,705 B1
(45) Date of Patent: Apr. 27, 2004

(54) ENHANCED ACOUSTIC DETECTION OF GAS LEAKS IN UNDERGROUND GAS PIPELINES

(75) Inventors: James Emerson Huebler, Brookfield, IL (US); Christopher John Ziolkowski, Elmhurst, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 10/439,157

(22) Filed: May 15, 2003

(51) Int. Cl.[7] .................................. G01M 3/24
(52) U.S. Cl. ..................... 73/40.5 A; 73/592; 702/51
(58) Field of Search .................... 73/40.5 A, 592; 702/51, 54

(56) References Cited

U.S. PATENT DOCUMENTS

| | | | |
|---|---|---|---|
| 3,055,209 A | 9/1962 | Reid et al. | |
| 3,223,194 A | 12/1965 | Michael | |
| 3,264,864 A | 8/1966 | Reid et al. | |
| 3,462,240 A * | 8/1969 | Bosselaar et al. | 73/40.5 A |
| 4,083,229 A | 4/1978 | Anway | |
| 4,289,019 A | 9/1981 | Claytor | |
| 4,455,863 A | 6/1984 | Huebler et al. | |
| 4,457,163 A * | 7/1984 | Jackle | 73/40.5 A |
| 4,640,121 A * | 2/1987 | Leuker et al. | 73/40.5 A |
| 4,858,462 A | 8/1989 | Coulter et al. | |
| 5,038,614 A | 8/1991 | Bseisu et al. | |
| 5,058,419 A | 10/1991 | Nordstrom et al. | |
| 5,117,676 A | 6/1992 | Chang | |
| 5,349,568 A | 9/1994 | Kupperman et al. | |
| 5,408,867 A * | 4/1995 | Kunze et al. | 73/40.4 A |
| 5,416,724 A | 5/1995 | Savic | |
| 5,531,099 A | 7/1996 | Russo | |
| 5,974,862 A * | 11/1999 | Lander et al. | 73/40.5 A |
| 2001/0045129 A1 * | 11/2001 | Williams et al. | 73/592 |

* cited by examiner

*Primary Examiner*—Hezron Williams
*Assistant Examiner*—John C Hanley
(74) *Attorney, Agent, or Firm*—Mark E. Fejer

(57) ABSTRACT

A method for locating gas leaks from underground gas pipelines in which a first acoustic sensor having a first signal output is positioned in ground disposed substantially above or at a distance from the underground gas pipeline. At least one second acoustic sensor having a second signal output is positioned in the ground at a plurality of locations substantially above the underground gas pipeline. The output signals from the acoustic sensors are measured for each location of the second acoustic sensor and the signals are adaptively filtered to remove common noise signal components. The statistical minima of these rms voltages are determined for both the first output signal and the adaptively filtered second output signals and the differences determined. The location of the second acoustic sensor corresponding to the largest positive said difference is the location closest to the leak site.

14 Claims, 7 Drawing Sheets

ENHANCED ACOUSTIC DETECTION OF GAS LEAKS IN UNDERGROUND GAS PIPELINES

BACKGROUND OF THE INVENTION

1. Field of the Invention

This invention relates to a method and apparatus for locating gas leaks from underground gas-containing pipelines by acoustic means. More particularly, this invention relates to the use of acoustic sensors for pinpointing the location of a gas leak from an underground gas pipeline so as to avoid unnecessary excavation of the ground surrounding the pipeline.

2. Description of Related Art

Gas leaks from underground gas pipelines are a significant problem in terms of both the amount of revenues lost to gas companies and the potential hazards presented. The locations of such leaks are also very difficult to pinpoint, particularly when the gas has migrated beneath pavement or frozen ground, when the gas has spread over a large area, when multiple leaks are present, or when the water table is high and gas and air are displaced from the ground. Leaks from low-pressure (6–12 inches of water column; ¼ to ½ psig) cast-iron pipelines are often particularly difficult to pinpoint using current technology, such as a combustible gas indicator. Given the substantial costs associated with excavation of the ground surrounding a leaking underground gas pipeline, it is critical that the locations of such leaks be readily determinable to minimize the extent of the excavations required, to avoid unnecessary excavations and to limit the amount of manpower and time required to locate the leaks. The objective of leak detection methods is to be able to pinpoint the location of a leak within plus or minus two feet, which corresponds to the size to the hole typically required to repair the leak. Newly emerging keyhole leak repair methods put a premium on high accuracy (±4 inches) leak pinpointing. It is also highly desirable that any such leak detection methods and devices employing such methods be readily usable in the field by gas utility crews.

One known technique for detecting leaks from underground gas pipelines involves detecting the sound/vibrations created by the gas escaping through the leak. However, to accomplish this feat, it is necessary to be able to detect very small leak acoustic signals and to be able to differentiate the leak sounds/vibrations from ever present background noises.

Sonic leak detectors and leak pinpointers can be divided into two general groups: detectors for leaks of liquid materials and detectors for leaks of gaseous materials. Liquid leaks generally create louder sound waves than gas leaks and higher pressure leaks are generally louder than lower pressure leaks. U.S. Pat. No. 4,083,229 to Anway teaches location of a leak in an underground water pipe using spaced detectors in contact with the pipe to improve sensitivity. U.S. Pat. No. 3,223,194 to Michael teaches a sonic vibrator locator for detecting leaks in water pipes, which locator has multiple vibration transmitting prongs in a specially shaped base and in a special arrangement relative to a transducer, which may be used for detecting vibrations in soft top earth.

With respect to leak detection in connection with gas pipelines, U.S. Pat. No. 4,289,019 to Claytor teaches a method and apparatus for passive detection of a leak in a buried pipe in which two detectors of acoustic signals are placed at separate locations on opposite sides of the leak. The signals detected by the two detectors are coupled to a single location for processing by an apparatus for measuring the correlation between the two signals. The cross-correlogram of the two signals provides a measure of the distance of the leak from each of the two measuring points and, thus, the location of the leak.

U.S. Pat. No. 5,058,419 to Nordstrom et al. teaches a method and apparatus for determining the location of a sound source, which apparatus includes a first detector located at a first location remote from the sound source, a second detector located at a second location remote from the sound source, and a computer which receives signals from the two detectors. The computer calculates a first frequency component and a first phase angle of the first signal and a second frequency component and a second phase angle of the second signal. The computer then calculates phase differences between the first phase angle and the second phase angle at each of a plurality of frequencies and converts the phase differences into a plurality of time lags. The computer then adds to each time lag of the plurality of time lags integer multiples of an associated period to form a plurality of potential time delays at each of the plurality of frequencies. The computer then determines which time delay occurs most frequently among all of the plurality of potential time delays at all of the plurality of frequencies. Utilizing the most frequently occurring time delay, the computer then calculates the location of the sound source.

U.S. Pat. No. 5,531,099 to Russo teaches a method of determining a defect in a buried conduit in which sensors are attached to the conduit at two locations separated by a known distance and a vibration imposed upon the conduit on one side of the sensors, which vibration is detected by both sensors. The process is then repeated where a second vibration is imposed on the other side of the sensors. The signals generated by the sensors are recorded, in either analog or digital form, filtered to pass a frequency band from 4000 to 8500 Hz to discriminate against turbulent flow noise in the system, noise transmitted by the conduit, and single frequency tones, and then a cross-correlation function from data obtained from the sensors from the first imposed vibration calculated to obtain a raw plot of a first time differential, and the same is done for the second vibration. Each raw plot of time differential is smoothed to obtain a peak time differential in each plot. The center velocity of propagation is determined using the first peak time differential and the known spacing between the sensors, and the process is repeated for propagation in the other direction. The flow rate and direction of the medium in the conduit are then calculated from the difference in velocities.

U.S. Pat. No. 5,349,568 to Kupperman et al. teaches a method and system for locating fluid leaks in pipes in which a first microphone is installed within fluid in the pipe at a first selected location and sound is detected at the first location. A second microphone is installed within the fluid in the pipe at a second selected location and sound detected at the second location. A cross-correlation is identified between the detected sound at the two locations for identifying a leak location.

U.S. Pat. No. 4,858,462 to Coulter et al. teaches a method and apparatus for locating a leak in which the acoustic emissions generated by the leak are continuously monitored from at least two spaced locations using detectors at the spaced locations to form at least two continuous signals having background noise and spikes corresponding to the background noise and spikes of the acoustic emission, the spikes in the signals of the detectors being offset from each other in time by an amount corresponding to the difference in travel time for an acoustic emission to each of the spaced locations. To remove the background noise from the spikes in each signal, a detection threshold value is set in a floating manner so as to correspond to an average level for the signals. The offset in time between the spikes of the signals, in real time, is then measured to determine the relative position of the acoustic emissions with respect to the spaced locations.

U.S. Pat. No. 5,038,614 to Bseisu et al. teaches a method for determining the location of fluid leaks in conduits in which axial and/or torsional vibrations and strains on a conduit and/or fluid pressure fluctuations in the conduit are measured at spaced apart points and the frequency patterns analyzed and compared to determine the location of fluid leakage or the occurrence of some other event associated with operation of certain mechanisms, such as valves, interposed in or connected to the conduit.

U.S. Pat. No. 5,416,724 to Savic teaches an apparatus for determining the location of leaks in an underground pipe comprising a plurality of remote acoustic transmission sensor units distributed along the pipe, each unit containing equipment for analyzing acoustic signals from the pipe. The equipment includes a mechanism for identifying acoustic features of the acoustic signals which distinguish the acoustic signals of a leak from ambient acoustic signals and a control unit connected to each of the remote units for further analyzing the signals to determine the proximity of the signal to a particular remote unit and, using the amplitude of the signal and the transmission characteristics of the pipe, determining the location of the leak.

U.S. Pat. No. 5,117,676 to Chang teaches a leak detection system comprising a plurality of acoustic microphones disposed along the exterior surface of a pipeline and an acoustic spectrum analyzer responsive to signals from the microphones for detecting peaks in the spectral content of the signals which are at wavelengths which are multiples of twice the wall thickness. The vicinity of the hole location can then be determined by locating the microphone which generated the signals having peaks at the specific wavelength or harmonic thereof.

Previous efforts to improve the sensitivity of sonic detectors and control extraneous noise have not been as successful as desired, particularly for gas leaks. Numerous attempts at addressing these issues have been made over the years, but with only limited success. U.S. Pat. No. 4,455,863 to Huebler et al. teaches a method and apparatus for locating gas leaks from underground pipelines using a sound transducer attached to an elongated probe inserted into the ground for a substantial portion of its length. The elongated probe and transducer combination has an effective mechanical resonant frequency equal to or below the electrical resonant frequency of the sound transducer. The apparatus and method are said to improve sensitivity for detection of sounds created by leaking gas, thereby providing more accurate pinpointing of the gas leak. However, implementation requires a typical sensor/probe spacing of about two feet, which is extremely limiting in terms of the length of pipe that can be evaluated over a given period of time. In addition, the apparatus and method are generally not sensitive enough to detect leaks from cast-iron joints, cannot sufficiently minimize acoustic noise from buried electrical cables, and are limited in their ability to minimize acoustic and air traffic noise as well as other noises typically encountered at leak sites.

SUMMARY OF THE INVENTION

Accordingly, it is one object of this invention to provide a method and apparatus for sonic location of gas leaks from underground gas pipelines having improved sensitivity over conventional sonic gas leak detection means.

It is one object of this invention to provide a method and apparatus for sonic location of gas leaks from underground gas pipelines which increases the efficiency of sonic leak detection over conventional means by increasing the length of pipeline that can be considered in a given period of time.

It is yet another object of this invention to provide a method and apparatus for sonic location of gas leaks from underground gas pipelines which enables the detection of gas leaks from cast-iron joints.

It is still a further object of this invention to provide a method and apparatus for sonic location of gas leaks from underground gas pipelines which is more effective at addressing issues related to background noise than conventional means.

It is another object of this invention to provide a method and apparatus for sonic location of gas leaks from underground gas pipelines which is sufficiently accurate to reduce the extent of excavation required to repair the leak compared to conventional means.

These and other objects of this invention are addressed by a method and apparatus for locating gas leaks from underground gas pipelines in which a first acoustic sensor having a first signal output is positioned in the ground substantially above the underground gas pipeline or at a distance from the underground gas pipeline. In the former case, it is important that the first acoustic sensor not be located directly above the leak. A second acoustic sensor having a second signal output is positioned in the ground at a plurality of locations substantially above and along the underground gas pipeline. The output signals from the first acoustic sensor and the second acoustic sensor are measured for each location of the second acoustic sensor. Adaptive filtering is applied to the output signals resulting in an adaptively filtered output signal from the second acoustic sensor corresponding to each of the locations of the second acoustic sensor, whereby signal components common to both output signals, which common components correspond to the background noise, are eliminated from the output signal from the second acoustic sensors. An rms voltage for the output signal from the first acoustic sensor and an rms voltage for each of the adaptively filtered output signals from the second acoustic sensor and the differences there between are determined.

The location of the second acoustic sensor corresponding to the largest positive difference between the rms voltage of the first acoustic sensor and the rms voltage of the second acoustic sensor is then determined, which location corresponds to the location closest to a gas leak from the underground gas pipeline. In accordance with one preferred embodiment of this invention, in place of one second acoustic sensor disposed at multiple locations, a plurality of spaced apart second acoustic sensors disposed along a length of the underground gas pipeline are employed.

The acoustic sensors employed in the method of this invention may be accelerometers, velocity sensors or geophones or combinations thereof and are mounted on probes which are driven into the ground at the desired locations. The signal outputs from the sensors are operably connected to electronic means for measuring the output signals from the acoustic sensors, which electronic means are operably connected to electronic and signal processing means for reducing the effects of background noise on the measured output signals. The electronic and signal processing means employs a combination of at least two noise reduction techniques adaptive filtering and calculation of rms values over selected segments of the output signals.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

In accordance with one embodiment of this invention, two acoustic sensors are used to determine the location of gas leaks from underground gas pipelines. Preferred acoustic sensors for use in the method of this invention are selected from the group consisting of accelerometers, including optical fiber accelerometers, velocity sensors, geophones and combinations thereof. Amplifiers employed in the acoustic sensors should be as low as possible in thermal noise. In accordance with a particularly preferred embodiment, an accelerometer having a resonant frequency in the range of about 900 to about 2500 Hz is used. Soil normally attenuates most of the leak sound at frequencies higher than about 3000 Hz. Typically, the accelerometer does not need to be responsive to frequencies below about 100 Hz although, to achieve a minimum noise floor, it may be. Suitable accelerometers for use in this invention may be obtained from Wilcoxon Research, Inc. in Gaithersburg, Md. and PCB Piezotronics in Depew, N.Y.

Figure 2:
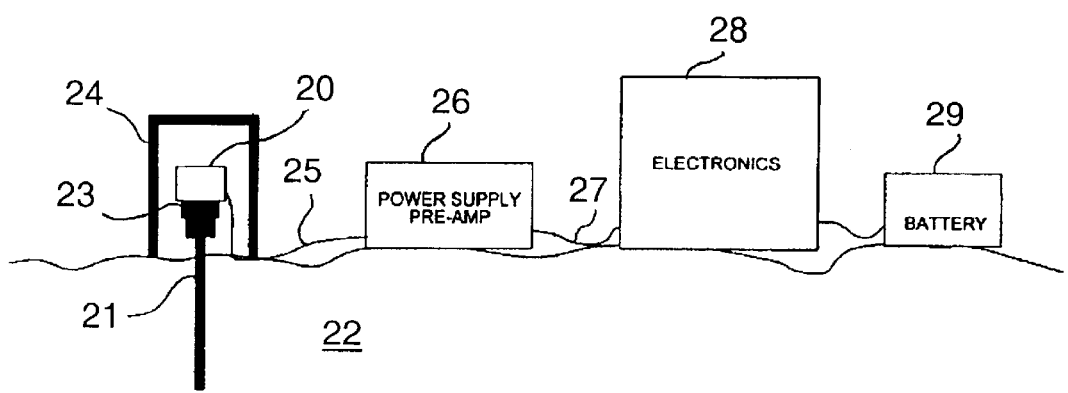
FIG. 2 is a schematic diagram of an apparatus in accordance with one embodiment of this invention.

As shown in FIG. 2, the acoustic sensors 20 are mounted on probes 21 that are driven into the ground 22 at desired locations. Mounting of the acoustic sensors 20 may be done by any suitable means. In accordance with one preferred embodiment of this invention, the acoustic sensors 20 are mounted on the probes 21 by quick-connect means 23. In accordance with a particularly preferred embodiment, the mounting is magnetic, thereby enabling quick release of the acoustic sensor 20 from the probe 21. Probes 21 suitable for use in the method and apparatus of this invention preferably have a length substantially equal to the depth of the underground gas pipeline under investigation, typically about 36 inches, although longer or shorter probes may be employed. Neither the probe 21 nor the acoustic sensor 20 should be in contact with the pipeline. Acoustic sensors 20 are covered by sound shields 24 to reduce the effects of airborne noise. Although the acoustic sensors 20 detect vibrations traveling through the ground, the sensor sensitivity is so great that airborne sounds often affect the sensors if the sound shields are not present. Suitable probes and sound shields are taught by U.S. Pat. No. 4,455,863, which is incorporated by reference herein in its entirety.

Each acoustic sensor 20 comprises a built-in amplifier (not shown) that is operably connected by suitable, typically coaxial, cables 25 to a very low-noise power supply/low-noise amplifier 26, which, in turn, is operably connected by suitable cables 27 to the electronics 28 used for processing of the acoustic sensor output signals. A battery 29 is connected to the electronics 28 to supply power. Batteries are a lower noise power supply than switching regulators or dc—dc converters. However, any suitable power supply may be employed for this purpose. It is critical that the built-in amplifiers have very low thermal noise, because the presence of thermal noise limits the minimum detectable leak signal. Low-noise power supply/low-noise amplifier 26 is used to power the built-in amplifiers in acoustic sensors 20.

Figure 1:
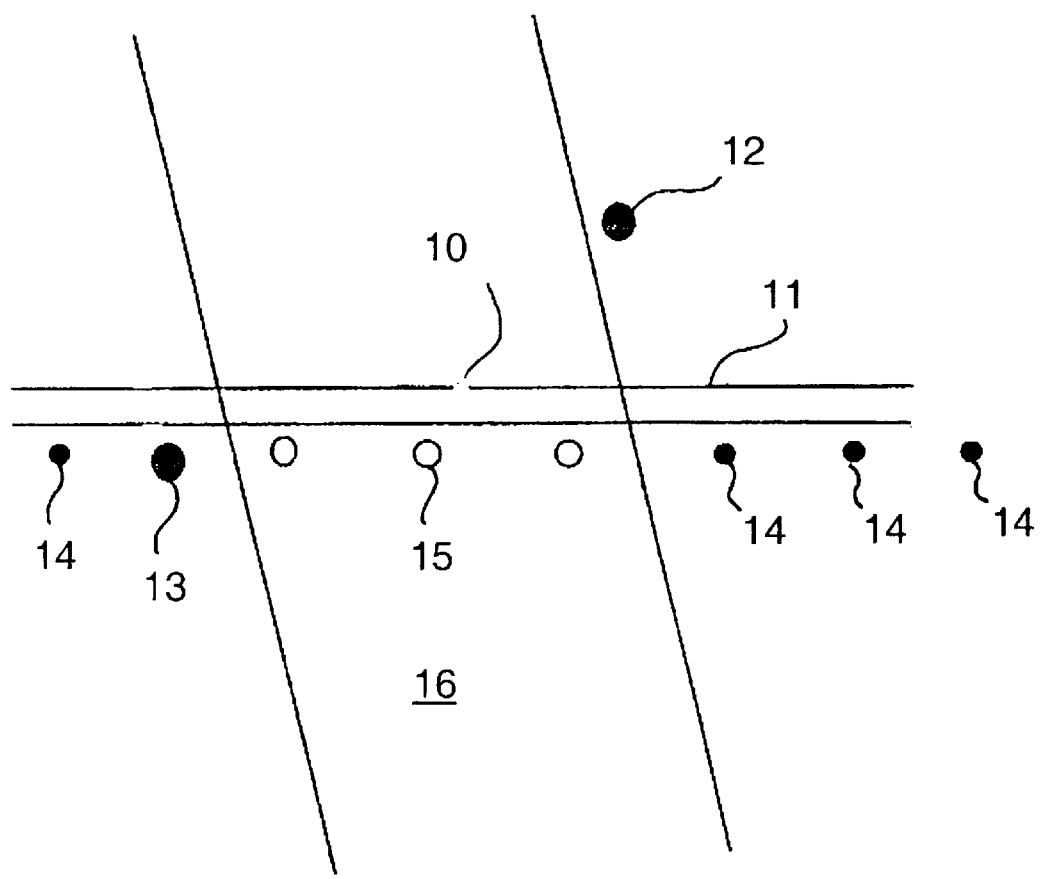
FIG. 1 is a diagram showing an exemplary disposition of acoustic sensors for performing the method of this invention.

As shown in FIG. 1, one acoustic sensor 12, referred to as a background sensor, is preferably positioned laterally from, i.e. to the side of, as opposed to above, the underground gas pipeline 11 that is suspected of leaking. In accordance with one preferred embodiment of this invention, placement of the background sensor 12 is preferably up to about 5 feet to the side of the pipeline. The background sensor 12 may be placed above or along the pipeline, however, care must be taken to ensure that it is not located at the site of the leak 10. If, however, this should occur, leak measurement readings obtained in accordance with the method of this invention will have negative values. Negative values indicate that the background sensor should be re-positioned.

A second acoustic sensor 13, referred to as a leak sensor, is placed at a plurality of locations 14 along the pipeline 11, i.e. substantially above the pipeline. In accordance with a particularly preferred embodiment of this invention, a plurality of leak sensors 13 are deployed along the pipeline 11. The probes should be close to, but not in contact with, pipeline 11. To increase measurement and data analysis efficiency the leak sensors 13 should be spaced apart as far as possible while still obtaining useful results. Preferably, spacings between the leak sensors are in the range of about 2 to about 10 feet. We have found that spacing between the leak sensors 13 of about 4–5 feet provides the best results.

As previously stated, the acoustic sensors are connected to probes that are driven into the ground at the desired locations. In cases where pipeline 11 runs beneath pavement 16, or similar types of areas, holes 15 are drilled to enable placement of the probes at locations covered by the pavement. Holes 15 must be of sufficient size to permit insertion of the probes without contact with the pavement. In cases where the probe is driven into the ground in a manner resulting in contact between the probe and the pavement, a cushioning material, such as a cotton work glove or similar soft cloth (not shown), is inserted between the probe and the pavement so as to isolate the probe from the vibrations in the pavement.

Figure 3:
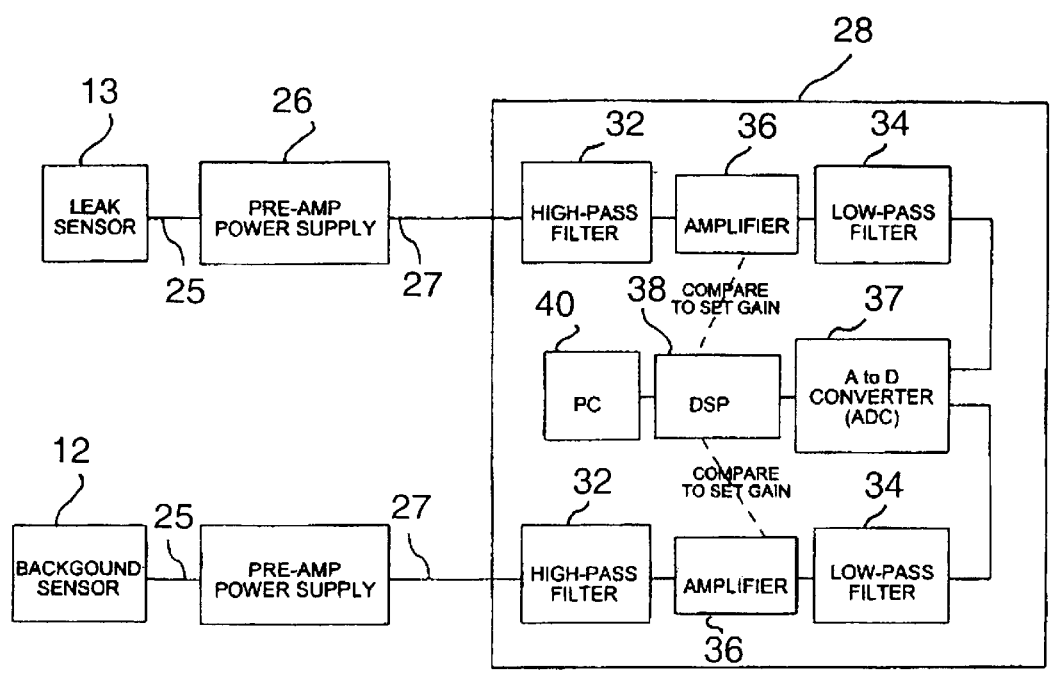
FIG. 3 is a schematic diagram setting forth details of the electronics employed for processing the output signals from the acoustic sensors in accordance with one embodiment of this invention.

As shown in FIG. 3, electronics 28 comprises a plurality of low-noise components. High-pass filter 32 and low-pass filter 34 provide a portion of the conditioning for the acoustic sensor output signals. High-pass filter 32 helps to minimize the effects of low frequency background noises, including 60 cycle vibrations from underground electrical cables. Low-pass filter 34 acts as an antialiasing filter. As previously stated, leak signal and background noise frequencies above about 3000 Hz are highly attenuated by the soil. Frequencies below about 250 Hz are often dominated by background noise. As a result, in accordance with one preferred embodiment of this invention the band-pass portion of electronics 28 has cut-off frequencies of about 250 Hz and 3000 Hz.

Electronics 28 in accordance with one embodiment of this invention further comprises automatic gain control amplifiers 36, which are controlled by computer (PC) 40 to automatically amplify the signal to the optimum level for the analog-to-digital converter (ADC) 37. It is well known to those skilled in the art that the filters and automatic gain control functions can be performed sequentially or integrated together for a more efficient design.

It will be apparent to those skilled in the art that the relative locations of the filters and amplifiers can be moved and/or the cables replaced with radio or other wireless links without changing the nature of the invention, and such embodiments are deemed to be within the scope of this invention. By way of example, a portion or all of the analog signal conditioning by electronics 28 can be moved closer to the acoustic sensors or even included within the housings of the acoustic sensors. Alternatively, with the exception of the built-in amplifier, the analog signal conditioning can be moved to an instrument.

Analog-to-digital converter 37 is used to digitize the signals from the acoustic sensors 12, 13. In accordance with one preferred embodiment of this invention, analog-to-digital converter 37 has a resolution of 16 bits. A digitization rate of 6000 Hz is selected to span the likely range of leak signals, up to about 3000 Hz, to optimize the number of adaptive filter taps and to minimize the effects of 60 Hz noise. The digitized signals are then fed to digital signal processor (DSP) 38, which, in accordance with a preferred embodiment of this invention, is able to perform 24-bit math.

In accordance with the embodiment shown in FIG. 3, two microprocessors are employed. One microprocessor, DSP 38, is specialized for digital signal processing functions while the other microprocessor, PC 40, is the type employed in personal computers. The analog conditioned and digitized signals from the acoustic sensors are processed by the DSP 38 and PC 40 in several ways. In accordance with one embodiment of this invention, DSP 38 performs adaptive filtering and root mean square (rms) voltage calculations. The adaptive filtering is used to cancel background noises common to both the background sensor and the leak sensor. Preferably, four sets of rms values are calculated and used by DSP 38 to detect and flag the existence of noise above a noise threshold level and to test for "run away" conditions in the adaptive filtering coefficients. PC 40 sets the gains for amplifiers 36, sorts and performs statistics on the rms values, calculates the final digital signal leak pinpointing (DSLP) reading, and displays the data.

Figure 4:
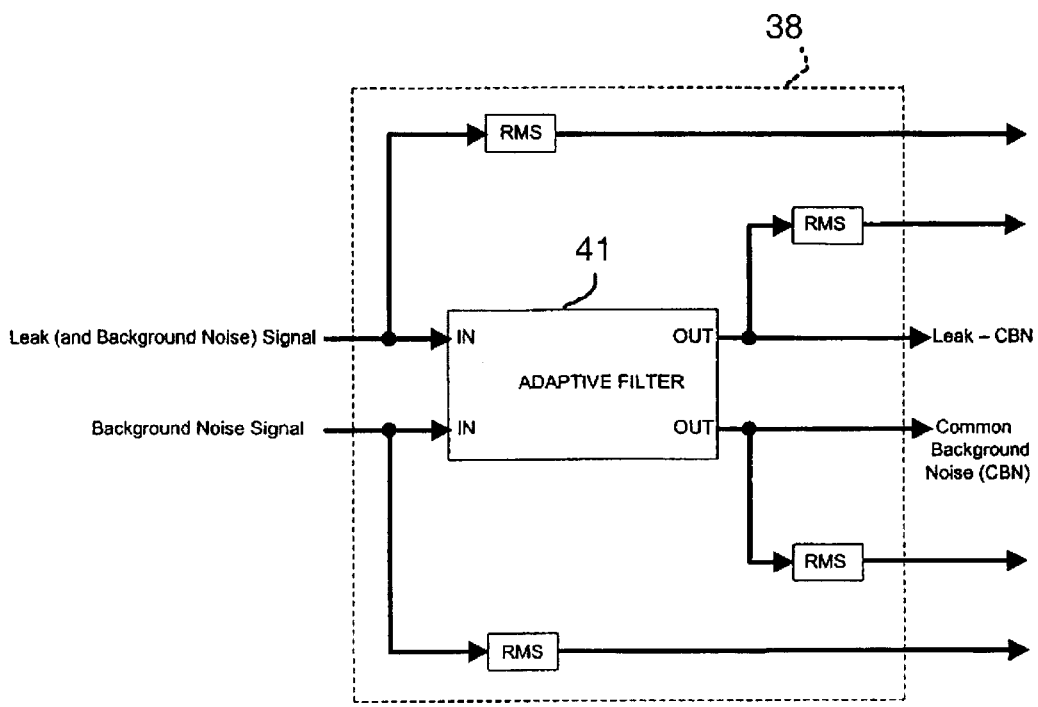
FIG. 4 is a schematic diagram of an adaptive filter in accordance with one embodiment of this invention.

FIG. 4 is a schematic diagram showing the data streams entering and leaving DSP 38. As shown, there are two inputs to and two outputs from adaptive filter 41. The two inputs are the conditioned and digitized signals from the leak sensor and background sensor. One of the two outputs from adaptive filter 41 is the common background noise (CBN) to both the leak sensor and the background sensor. The other output is the output signal from the leak sensor with the common background noise removed by the adaptive filtering process. This new signal, hereinafter referred to as the "site signal", is the difference between the leak sensor signal and the common background noise signal. The site signal and the common background noise signal are both signals synthesized by the adaptive filter. Both appear as a stream of 16 bit samples at a rate of 6000 samples per second, the same resolution and rate at which the sensor data enters the adaptive filter. It will, however, be apparent to those skilled in the art that other sample sizes and sample rates may be employed and such other sample sizes and sample rates are deemed to be within the scope of this invention. The site signal is placed into a ring-buffer memory. Similarly, the common background noise is generated and stored in its ring-buffer memory. DSP 38 also computes rms values for four quantities.

Figure 5:
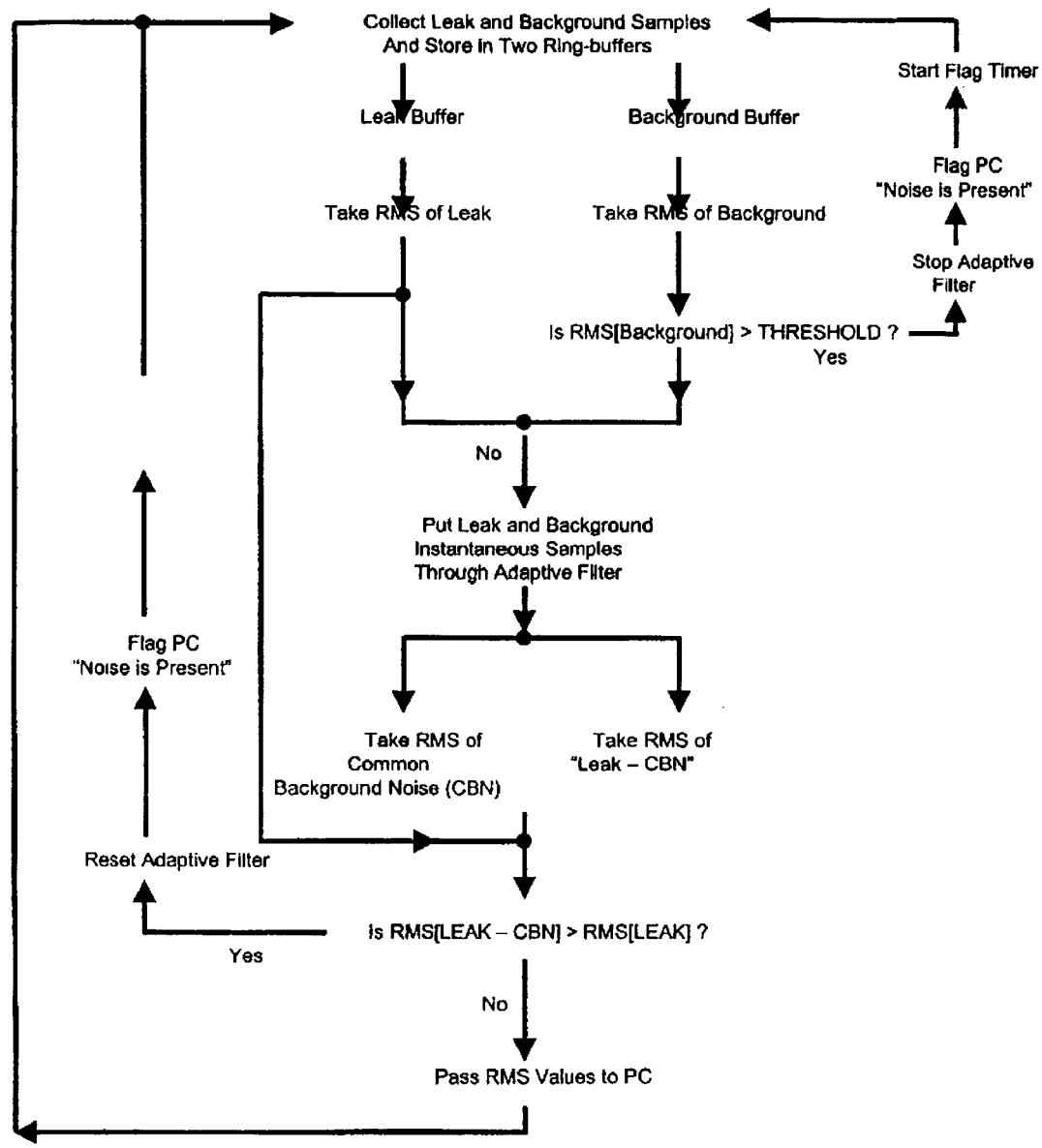
FIG. 5 is a flow diagram showing the digital signal processing employed in accordance with one embodiment of this invention.

FIG. 5 is a flow diagram of the data processing performed by DSP 38 in accordance with one exemplary embodiment of this invention. Analog-to-digital converter 37 at its digitization rate creates new values of the signal-conditioned leak and background sensor output signals which are then fed into DSP 38. The DSP synthesizes the common background noise signal and then the site signal by subtracting the common background noise from the leak signal sensor. This brings the total to four signals that are tracked. The 256 most recent digitized samples of each signal are stored in first ring-buffer memories. The ring-buffer memories in accordance with this exemplary embodiment hold 256 values although only 128 values are actually used. As a new value is collected, the oldest value is discarded from the memory. Second ring-buffer memories store the most recent digitized inputs from the background sensor.

For this exemplary system in which only 128 of the stored digital inputs are employed, the rms values for the leak sensor output signals and the background sensor output signals are calculated from the 128 most recent inputs of each. Each of the four rms voltages, two for each of the leak sensor output signals and background sensor output signals as shown in FIG. 4, is obtained as follows. The 128 most recent digitized voltage values stored in a ring-buffer memory are used in the computation. Each of the 128 values is squared and then averaged to form a mean square value. The square root of the mean square value is then taken to yield the rms voltage. This process is repeated every time a new digitized value is added to the memory buffer. Thus, a new rms voltage is calculated at the digitization rate.

At times, the background noise at a leak site may be too noisy for the collection of meaningful data. The rms value of the background sensor output signal is compared to the pulse-noise threshold as a test for unacceptable background noise. This occurs, for example, when an airplane passes overhead or when a truck or car is driving past the sensors. At most leak sites, the excessive noise occurs only for short periods of time. That is, the noise comes in "pulses." The effects of this type of noise can be greatly reduced by "gating" the signal, that is by turning the data collection on and off. This approach is implemented by the DSP by comparing the rms voltage from the background sensor to the pulse-noise threshold. The pulse-noise threshold is determined experimentally. When the background rms value is larger than the pulse-noise threshold, the adaptation of the filter is stopped. This is accomplished by not allowing changes to the filter coefficients, a means well known to those skilled in the art. The flag "Noise is present" is set for the PC. A timer is started for a preset length of time. The length of time is longer than that required for 128 new inputs from the ADC. As long as the timer is set, the noise flag remains activated and the PC accepts no new data. However, new inputs from the ADC continue to be processed at the digitization rate. Every time the rms value of the background remains high, the timer is reset. This procedure is used to allow any pulses of noise to pass through the adaptive filter before allowing adaptation to resume. This approach provides a practical way in which to eliminate unwanted data and it substantially prevents loud background noise from drastically corrupting the adaptive filter coefficients.

If the rms voltage of the background sensor output signal is below the to pulse noise threshold, the leak and background instantaneous signals are fed into the adaptive filter and processed. As previously indicated, in accordance with one embodiment of this invention, the digital signal processor is programmed to perform adaptive filtering. The adaptive filtering uses 128 most recent digitized values of the signals from the background sensor and the leak sensor in a least mean square algorithm to eliminate signals common to both sensors. Signals common to both sensors correspond to background noise from vehicular and airplane traffic, air conditioners, etc. Only the leak sensor, if it is close to the leak, should detect the leak signal. The "site" output of the filter is fed back and combined with the adaptive filter control parameters to adjust the adaptive filter coefficients in real time. In this embodiment, there are 128 coefficients, one corresponding to each of the 128 most recent samples from the background sensor. This structure is known to those skilled in the art as an Adaptive Finite Impulse Response (AFIR) filter. In effect, this models the acoustic path difference between the leak and background sensors. Thus, the adaptive filtering automatically minimizes the effects of time varying background noises. The parameter controls of gain and leakage (not shown) are used to adjust the operating characteristics of the adaptive filter.

As previously stated, there are two outputs from the adaptive filter, the background noise common to both sensors and the leak signal with the common background noise removed by the adaptive filtering process, i.e. the site signal. A new site signal value is created at the digitization rate and placed into a ring-buffer memory. Similarly, the common background noise signal is generated and stored in its ring-buffer memory. The DSP computes the common background noise rms and the site rms values in the same manner as for the leak and background rms's.

The next operation is a test for corrupted adaptive filter coefficients. Because the site rms value is the leak signal reduced by the common background noise, the site rms should always be less than the leak rms. If the site rms is greater than the leak rms, the adaptive filter coefficients have been upset or are "running away." All of the coefficients of the adaptive filter are reset and a flag "Noise is present" is sent to the PC. In accordance with one embodiment of this invention, the adaptive filter coefficients are set to zero, although they could be set to a predetermined non-zero set of values which could speed recovery of the adaptive filter from the reset. If the conditions are normal and the site rms is less than the leak rms, at the next digitization, the process repeats and the rms data are presented to the PC.

The processing of the rms values and adaptive filtering is performed sequentially as opposed to simultaneously. However, the time delays inherent in processing of the background, leak and site rms values are small compared to the total time encompassed by the rms values and, in practice, have very little effect on the results. In addition, field experience has shown that the time span covered by the rms value is long enough to be representative of the acoustic signals at the leak site, yet short enough to account for time varying background noise effects.

Figure 6:
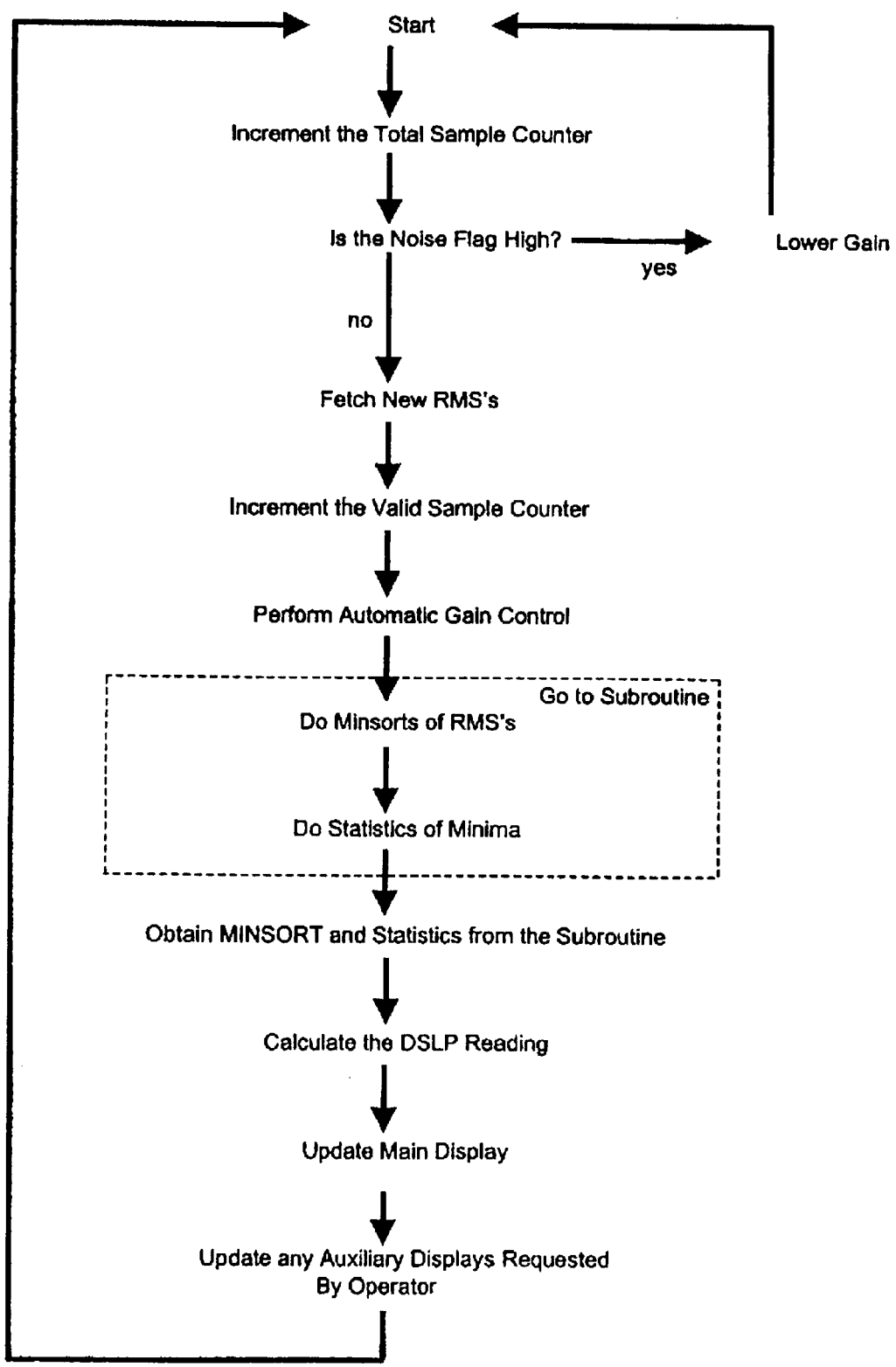
FIG. 6 is a flow diagram showing the PC functions employed in accordance with one embodiment of the method of this invention.

FIG. 6 is a flow diagram showing the functions performed by the PC. At time intervals greater than 128 digitization periods, the PC collects data and flags from the DSP. In that length of time, the portion of the ring-buffer memories used to calculate the rms values has been filled with new data so that all of the new rms data are statistically independent of the previous rms values. The total sample counter is incremented after which the PC tests for noise flags. If a noise flag has been set by the DSP, the PC lowers the gain in the amplifiers by one step. If no noise flags are set, new rms values are obtained from the DSP for the leak, background, site, and common background noise signals. The valid sample counter is incremented. The larger of the leak and background rms values is used to adjust the automatic gain control amplifiers. The purpose of the automatic gain control is to maintain the leak and background signals supplied to the ADC in the optimum voltage range.

Each time a new set of rms values is obtained by the PC, the total sample counter is incremented, whether or not the threshold and gain criteria are met. A second counter, the valid sample counter, is incremented only for valid signals. These values are displayed to the operator and provide a measure of the background noise. If the total count exceeds the valid count by more than 50%, the site is very noisy and extra care must be taken in interpreting the results.

Figure 7:
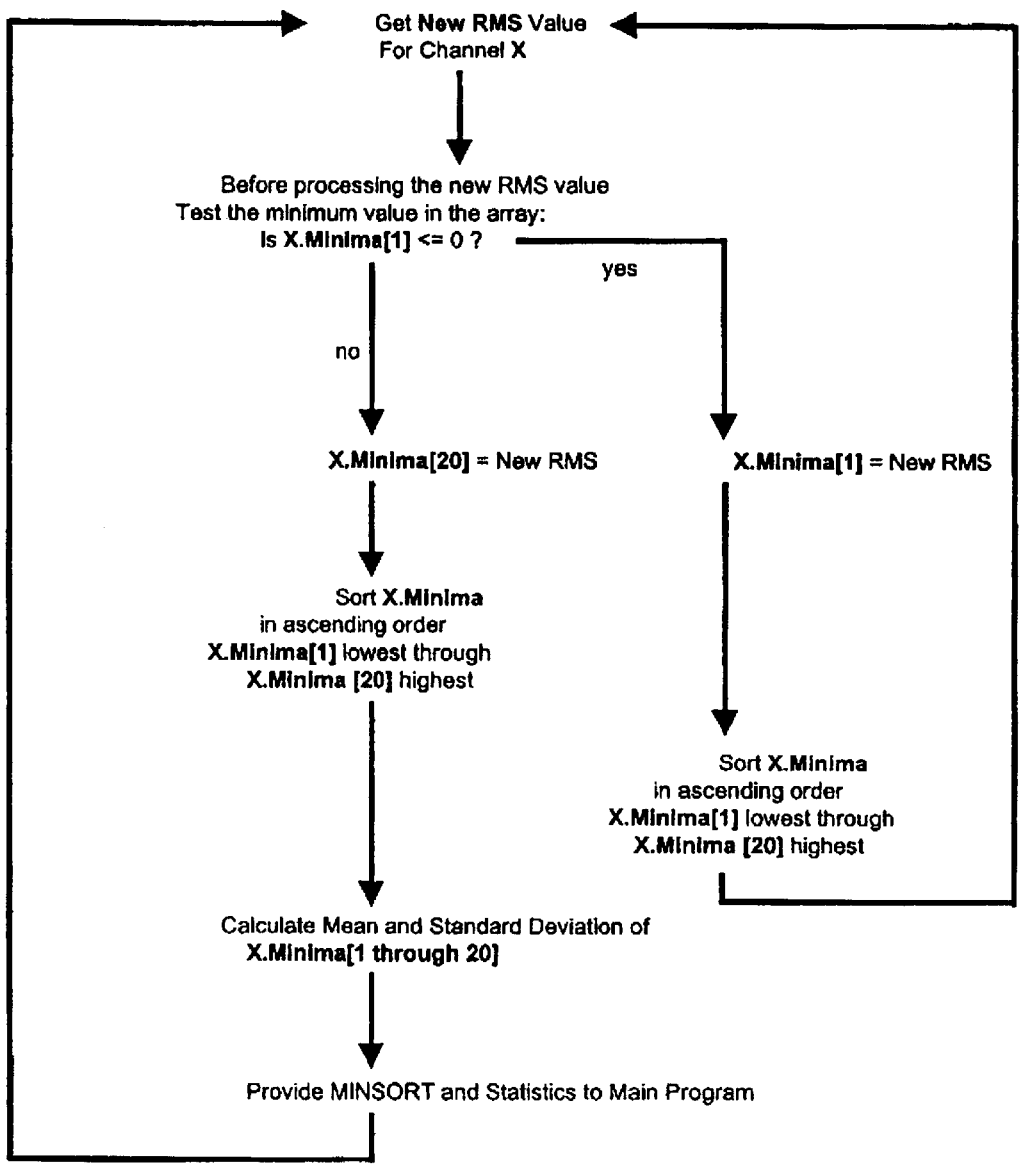
FIG. 7 is a flow diagram setting forth the sort and statistical routines employed for application of the noise reduction techniques in accordance with one embodiment of the method of this invention.

The valid values for the leak, background, site, and common background noise rms's are collected from the DSP and stored in four arrays in the PC. (Valid means that the pulse-noise threshold criteria are not violated.) These values are sorted and the lowest values of each are retained. The sorting process is referred to herein as MINSORT. The mean and standard deviation of the lowest 19 values in MINSORT are calculated. The flow diagram of the MINSORT and statistics process are shown in FIG. 7. For each rms quantity, the most recent valid sample is obtained. Before processing the newest value, the minimum value in the array, X.Minima, is tested to determine if it is less than or equal to a pre-selected value. The preselected value may be zero or it may be equal to the minimum valid signal—that of the thermal noise floor of the instrument. The thermal noise floor of the instrument is a good choice for a sensor whose amplifier can saturate when it is jarred, for example when it is moved, and short out the input. If X.Minima is less than or equal to the test value, then X.Minima is set equal to the newest rms value in order to eliminate the suspect value. On the other hand, if X.Minima is less than the test value, then X.Minima is set equal to the newest rms value. In both cases, the next step is to sort the X.Minima in ascending order X.Minima lowest, indicated in FIG. 7 as "X.Minima[1]", through X.Minima highest, indicated in FIG. 7 as "X.Minima[20]". The rationale for this process is that when the leak sensor is near a leak, the leak signal is always present, while the amount of background noise present is variable. Thus, the quietest values are most representative of the leak signal. Field experience has shown that collecting a total of 200 valid samples at each probe location and keeping the 20 lowest values is a good compromise between noise rejection and productivity. Productivity here is measured in terms of the amount of time required for a reading. Requiring that the standard deviation of the X.Minima be below some value is another method of determining when to stop data collection. It will be apparent to those skilled in the art that other numbers of values could be selected and would work equally well without affecting the nature of the invention.

The average and standard deviation of X.Minima lowest (X.Minima[1]) through X.Minima highest (X.Minima[20]) are calculated. These values are then provided to the main program. After completion of the MINSORT, the lowest and highest X.Minima values are obtained from the subroutine shown in FIG. 6.

A very low pulse-noise threshold value and a very high number of samples can be selected to reduce the effects of background noise to an arbitrarily small value. However, such a value can reduce the productivity of the sonic leak pinpointer so low that it is not a practical instrument acceptable to utility crews. Very stringent noise criteria will lead to very long processing times. On the other hand, a high pulse-noise threshold value and small number of valid samples can result in an excessive amount of background being incorporated into the leak signal result. Leak sites with high and/or variable background noise will result in incorrect results, with some background noise being interpreted as leak signal. A method minimizing this effect is part of the process and comprises performing a MINSORT process on the background and site rms values. The background average is subtracted from the site average to yield the DSLP reading for that probe position.

Data displayed to the operator include the most recent leak sensor rms, the minimum and maximum of the lowest set of site rms values, the mean of the lowest site values, the mean of the lowest background and the difference between the site and background means, that is, the DSLP reading. These data are updated after each sample. A variety of displays, such as waveforms and spectra of the signals from the acoustic sensors, can be requested by the operator. When they are requested, the display is updated to provide the relevant information. A graphical display of the site rms values is made as a function of time to provide the operator with information on the leak/background noise signal. The most recent leak and background rms values are displayed as a bar graph.

The above described process is repeated until the operator manually stops the data collection when a sufficient number of valid samples have been collected. Alternatively, the data collection could be automatically stopped when some criterion is met, such as the total number of valid samples above a selected value and with the spread in values less than some standard deviation.

The DSLP reading value is recorded and the leak sensor is moved to the next location. The highest reading is obtained at the probe closest to the leak. Additional probe positions can be used to more precisely pinpoint the leak. As a practical operating feature, pressing the spacebar on the keyboard resets the rms MINSORT values, sample counters, adaptive filter coefficients and the sorting arrays to zero, after which the process may be restarted.

Using the method and apparatus of this invention, leaks from low-pressure (¼ psig) cast-iron joint leaks can be detected and pinpointed. In the exemplary embodiment disclosed herein, two microprocessors are employed for performing the calculations. It will, however, be apparent to those skilled in the art that several possible configurations of microprocessors are possible. For example, the PC could be a laptop with a DSP PCMCIA card, or with a sufficiently fast PC, all of the data processing could be performed by the PC.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

We claim:

1. A method for locating gas leaks from underground gas pipelines comprising the steps of:

positioning a first acoustic sensor having a first signal output in ground disposed one of substantially above said underground gas pipeline and at a distance from said underground gas pipeline;

positioning at least one second acoustic sensor having a second signal output in said ground at a plurality of locations substantially above said underground gas pipeline;

measuring a first output signal from said first acoustic sensor;

measuring a second output signal from said second acoustic sensor at each of said locations;

adaptively filtering said first output signal and said second output signal resulting in an adaptively filtered second output signal corresponding to each of said locations whereby signal components common to said first output signal and said second output signal are eliminated from said second output signal;

determining a first rms voltage for said first output signal and a second rms voltage for each of said adaptively filtered second output signals;

determining a difference between a statistical minima of said first rms voltage and each of said second rms voltages; and determining said location of said second acoustic sensor corresponding to a largest positive said difference, resulting in identification of said location closest to a gas leak from said underground gas pipeline.

2. A method in accordance with claim 1, further comprising bandpass filtering of at least one of said first output signal and said second output signal.

3. A method in accordance with claim 1, wherein a plurality of said first rms voltages and a plurality of said second rms voltages are determined for each said location of said second acoustic sensor.

4. A method in accordance with claim 3, wherein said difference between said first rms voltage and said second rms voltage is determined by averaging a plurality of lowest first rms voltage values resulting in an average first rms voltage, averaging a corresponding plurality of lowest second rms voltage values, resulting in an average second rms voltage, and subtracting said average first rms voltage from said second rms voltage.

5. A method in accordance with claim 1, wherein an acoustic shield is placed over each of said first acoustic sensor and said second acoustic sensor.

6. A method in accordance with claim 1, wherein a plurality of said second acoustic sensors are deployed, each of said second acoustic sensors being disposed at one of said locations substantially above said underground gas pipeline.

7. A method in accordance with claim 6, wherein said locations are at least about 4 feet apart.

8. A method in accordance with claim 7, wherein said locations are in a range of about 4 to about 10 feet apart.

9. A method in accordance with claim 1, wherein said first acoustic sensor and said second acoustic sensor are mounted on probes driven into the ground.

10. A method in accordance with claim 9, wherein said probes have a probe length substantially equivalent to a depth of said underground gas pipeline.

11. A method in accordance with claim 1, wherein said first acoustic sensor and said second acoustic sensor are selected from the group consisting of accelerometers, velocity sensors, geophones and combinations thereof.

12. A method in accordance with claim 1, wherein said distance of said first acoustic sensor from said underground gas pipeline is less than about 10 feet.

13. A method in accordance with claim 12, wherein said distance is one of less than and equal to about 5 feet.

14. A method in accordance with claim 1, wherein said first output signal provides electronic gating for said second output signal whereby measurement of said second output signal is suspended when said first output signal is above a predetermined threshold.

* * * * *